US006735496B1

(12) United States Patent
Roman

(10) Patent No.: US 6,735,496 B1
(45) Date of Patent: May 11, 2004

(54) SYSTEM AND METHOD OF MONITORING MULTIPLE CONTROL LOOPS IN A HEATER SYSTEM

(75) Inventor: Alfred R. Roman, Hendersonville, TN (US)

(73) Assignee: Chromalox, Inc., Pittsburgh, PA (US)

( * ) Notice: Subject to any disclaimer, the term of this patent is extended or adjusted under 35 U.S.C. 154(b) by 0 days.

(21) Appl. No.: 10/272,808

(22) Filed: Oct. 17, 2002

Related U.S. Application Data

(60) Provisional application No. 60/342,901, filed on Oct. 19, 2001.

(51) Int. Cl.[7] .......................... G06F 19/00; H05B 3/02; H05B 1/02; H02H 3/08; H02H 9/02

(52) U.S. Cl. ....................... 700/207; 219/486; 219/490; 702/59; 361/93.1

(58) Field of Search ................................ 700/292, 293, 700/21, 79–81, 207; 702/58, 59; 219/476, 477, 480, 481, 483, 485–487, 508, 509; 361/42, 59, 71, 93.1, 93.2, 93.4; 324/509, 512

(56) References Cited

U.S. PATENT DOCUMENTS 4,701,598 A * 10/1987 Cooper ....................... 219/535
4,769,657 A * 9/1988 Takahashi ................... 347/171
4,774,526 A * 9/1988 Ito ............................. 347/171
4,849,701 A * 7/1989 Saatkamp et al. .......... 324/549
5,340,964 A * 8/1994 Galloway et al. ........... 219/486

* cited by examiner

*Primary Examiner*—Leo Picard
*Assistant Examiner*—Ryan Jarrett
(74) *Attorney, Agent, or Firm*—Kirkpatrick & Lockhart LLP

(57) ABSTRACT

A monitoring system includes a sensor that detects operating conditions in a plurality of control loops of a heater system and generates signals corresponding to the detected operating conditions. The monitoring system also includes a controller that receives the signals from the senor and determines whether the signals indicate the presence of an alarm condition in one or more of the control loops. The controller is configured to temporarily disconnect power to the plurality of control loops when it is determined that an alarm condition is present, determine whether the alarm condition is present in an individual connector loop, and reconnect power to only those control loops in which the alarm condition is not present.

25 Claims, 4 Drawing Sheets

SYSTEM AND METHOD OF MONITORING MULTIPLE CONTROL LOOPS IN A HEATER SYSTEM

This application claims the benefit of U.S. Provisional Application No. 60/342,901 filed on Oct. 19, 2001 and incorporated by reference in its entirety.

TECHNICAL FIELD

The present invention relates generally to systems and techniques for monitoring heater systems and, more particularly, to systems and techniques for determining current levels and ground fault conditions for multiple control loops of a heater system, such as a heat tracing system.

BACKGROUND

The monitoring of heating and temperature conditions of process system equipment, such as tanks and pipes, is a common industrial practice that may have many applications. For example, heating may be required to maintain heavy oils or resins at a certain viscosity to allow such fluids to be readily pumped through tanks and pipes. Heating also may prevent crystalline precipitation or freezing during a process, or may simply facilitate the process itself. Typically, monitoring and controlling the heating of process system equipment involves the use of heating elements and sensors.

An electrical heat tracing system is one example of a heating system that may be used for protection from freezing, maintenance of an adequate process temperature, and/or de-icing of structures (e.g., tanks, pipes, roofs, gutters). FIG. 1 illustrates a schematic of a conventional heat tracing system 10. As shown, the heat tracing system 10 include a controller 12, a plurality of heater loads 14_a–d_ (e.g., heat trace or heat strips), a plurality of control devices 16_a–d_, and a plurality of sensors 18_a–d_, 20_a–d_. A power bus 22 branches into individual connections 24_a–d_ for distributing power to each of the heater loads 14_a–d_. Each heater loads 14_a–d_ may, in turn, be attached to component needing heat such as a chamber, tank, vessel or pipe.

Each individual branch 24_a–d_ of the power bus 22 connecting to the heater loads 14_a–d_ includes a control device 16_a–d_ and sensors 18_a–d_, 20_a–d_. The control devices 16_a–d_ are switches that disconnect the flow of power to the heater loads 14_a–d_ from the power bus 22 when actuated by the controller 12.

The sensors typically include current monitors 18_a–d_ and ground fault detectors 20_a–d_. The current monitors 18_a–d_ detect changes in the current supplied to the heater loads 14_a–d_ and provide control signals to the controller 12 via control lines 28_a–d_. The controller 12 determines when the current supplied to any of the heater loads 14_a–d_ falls outside set parameters or meets an alarm condition. The controller 12 actuates the associated control device 16_a–d_ and breaks the flow of power to the heater load 14_a–d_ with the deviation in the current supply. The controller 12 receives separate signals from each of the current monitors 18_a–d_ and individually shuts off power to the heater loads 14_a–d_ when an alarm condition is indicated.

The ground fault detectors 20_a–d_ detect leakage in current due to a ground fault in the heater loads 14_a–d_. A ground fault in the heating cable involves leakage of current at some location along its length. A ground fault may occur in a system due to mechanical damage, flooding, cable chaffing or corrosion. In the event that one of the heater loads 14_a–d_ is grounded, the ground fault detector 20_a–d_ associated with the grounded heater load 14_a–d_ provides a signal to the controller 12 via one of the control lines 30_a–d_. The controller 12, in turn, actuates the associated control device 16_a–d_ and breaks the flow of power to the grounded heater load 14_a–d_. The controller 12 receives separate signals from each of the ground fault detectors 20_a–d_ and individually shuts off power to the heater loads 14_a–d_ when a ground fault condition is indicated.

As depicted in FIG. 1, each control loop of the conventional heat tracing system 10 is supported by many components including current monitors 1 8_a–d_, ground fault detector 20_a–d_ and control devices 16_a–d_. Given that a heat tracing system may have upwards of twenty-four separate control loops, a large number of sensors and detectors employed throughout the heater loads is required. Connecting the controller to the various sensors and detectors requires a great deal of installation and expense. Furthermore, the controller requires numerous inputs and outputs to properly connect to all of the sensors and requires the necessary processing ability to handle signals from the numerous sensors and detectors.

Accordingly, there is a need for monitoring heater systems in a way that overcomes, or at least reduces the effects of, one or more of the problems set forth above.

SUMMARY OF THE INVENTION

In one general aspect, a monitoring system includes a sensor that detects operating conditions in a plurality of control loops of a heater system and generates signals corresponding to the detected operating conditions. The monitoring system also includes a controller that receives the signals from the sensor and determines whether the signals indicate the presence of an alarm condition in one or more of the control loops. The controller is configured to temporarily disconnect power to the plurality of control loops when it is determined that an alarm condition is present, determine whether the alarm condition is present in an individual connector loop, and reconnect power to only those control loops in which the alarm condition is not present.

Implementations may include one or more of the following features. For example, the alarm condition may include a deviation in current level and/or a ground fault condition. The sensor may include a current monitor and/or a ground fault detector. The sensor may detect an ampere level of power supplied to the plurality of control loops, and the controller may compare the ampere level against a high setpoint and a low setpoint. The controller may include a database for storing data indicating an alarm condition in one or more control loops.

The monitoring system may include a plurality of control devices. Each control device may be configured to disconnect power to an individual control loop when actuated by the controller. Each control device may include an isolation contactor, a relay, and/or a circuit breaker.

The monitoring system also may include a first sensor and a second senor. The senor may first sensor may detect first operating conditions in the plurality of control loops and the second sensor may detect second operating conditions in the plurality of control loops. The controller may receive the signals from the first sensor and the second sensor and temporarily disconnect power to the plurality of control loops when it is determined that at least one of a first alarm condition and a second alarm condition is present in one or more of the control loops. The first sensor may include a current monitor and the second sensor may include a ground fault detector.

The heater system may include a power bus connecting the sensor and the plurality of control loops. The power bus may have a plurality of braches with each branch distributing power to an individual control loop. The sensor may be located on the power bus before the separation of the power bus into the plurality of branches.

In another general aspect, a monitoring method includes determining whether signals received from a sensor indicate the presence of an alarm condition in one or more control loops. The sensor detects operating conditions in a plurality of control loops of a heater system and generates signals corresponding to the detected operating conditions. The monitoring method also includes temporarily disconnecting power to the plurality of control loops when it is determined that an alarm condition is present, determining whether the alarm condition is present in an individual connector loop, and reconnecting power to only those control loops in which the alarm condition is not present.

Implementations may include one or more of the following features. For example, the alarm condition may include a deviation in current level and/or a ground fault condition. Determining whether the alarm condition is present in an individual connector loop may involve sending a test signal for detection by the sensor and/or reconnecting an individual control loop to a power bus and monitoring the power bus for the alarm condition. Monitoring the power bus for the alarm condition may involve detecting whether the power bus meets a specified parameter, for instance, by comparing an ampere level of the power bus against setpoint to determine if deviation has occurred in the individually reconnected control loop. The specified parameter may be indicative of current leakage due to a ground fault condition in the individually reconnected control loop.

In another general aspect, a computer program stored on a computer-readable medium includes a first routine for determining whether signals received from a sensor indicate the presence of an alarm condition in one or more control loops. The sensor detects operating conditions in a plurality of control loops of a heater system and generates signals corresponding to the detected operating conditions. The computer program also includes a second routine for temporarily disconnecting power to the plurality of control loops when it is determined that an alarm condition is present, a third routine for determining whether the alarm condition is present in an individual connector loop, and a fourth routine for reconnecting power to only those control loops in which the alarm condition is not present.

Implementations may include one or more of the following features. For example, the computer-readable medium may include a device, disk, and/or propagated signal. The alarm condition may include a deviation in current level and/or a ground fault condition. The computer program may include a routine for isolating one or more control loops having the alarm condition and/or a routine for storing data from the sensor.

Other features and advantages will be apparent from the following description, including the drawings, and from the claims.

Figure 1:
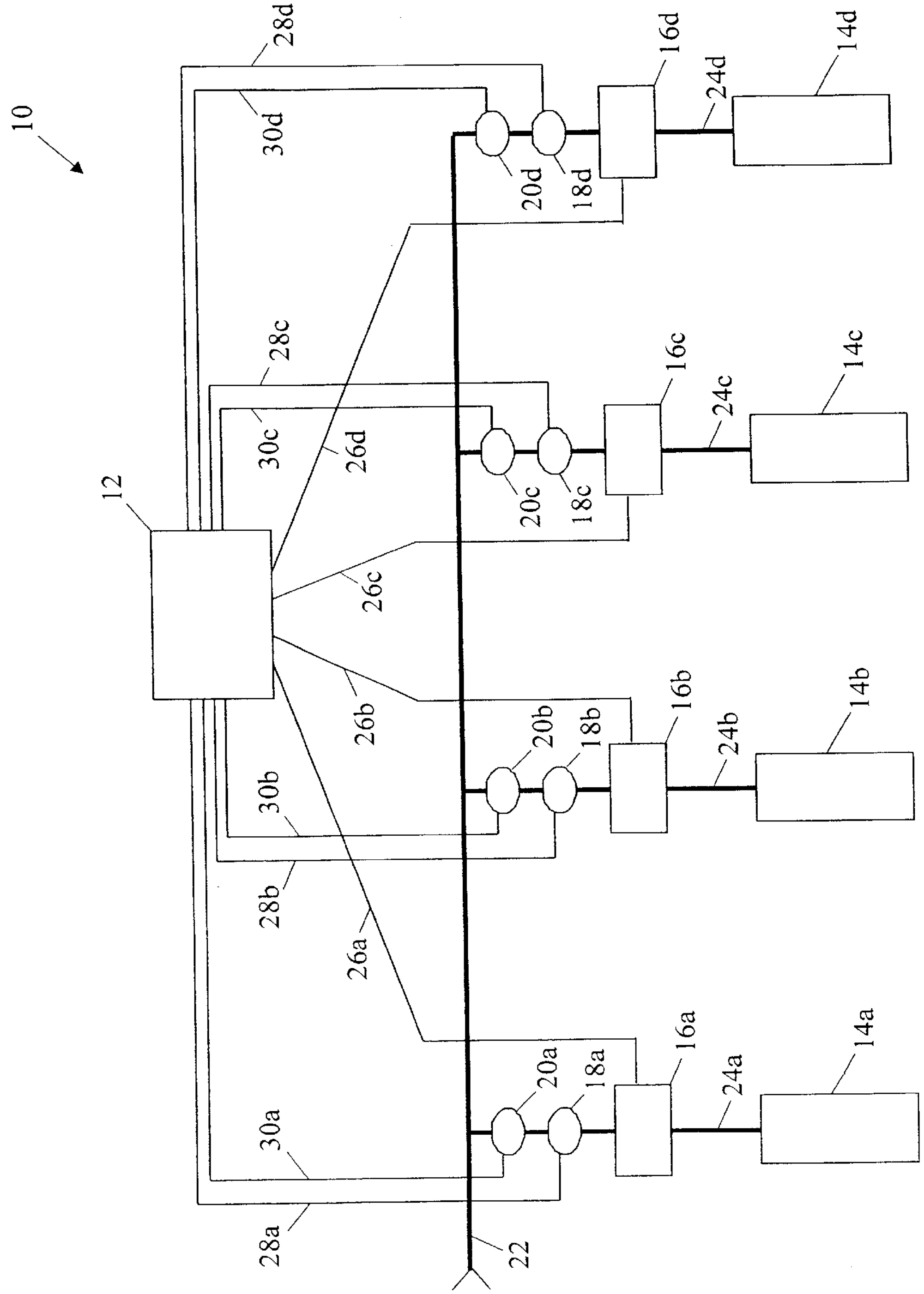
FIG. 1 (Prior Art)
FIG. 1 illustrates one embodiment of a conventional heat tracing system.

While the invention is susceptible to various modifications and alternative forms, specific embodiments are shown by way of example in the drawings and will be described in detail herein. However, it should be understood that the invention is not intended to be limited to the particular forms disclosed. Rather, the invention is to cover all modification, equivalents and alternatives falling within the scope of the invention as defined by the appended claims.

DETAILED DESCRIPTION OF THE INVENTION

Figure 2:
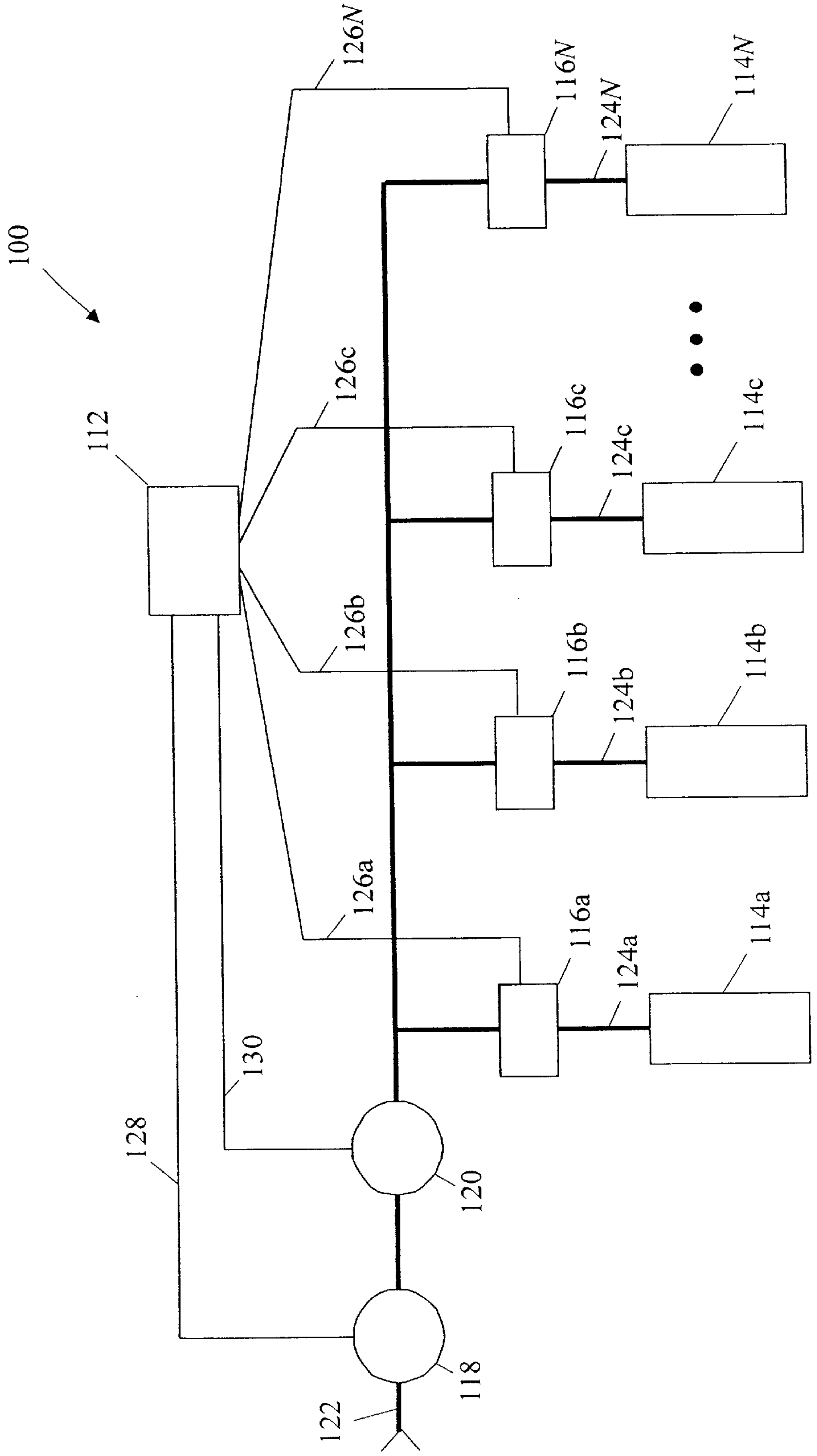
FIG. 2 illustrates one embodiment of a heat tracing system according to aspects of the present invention.

FIG. 2 illustrates a schematic of one embodiment of a heat tracing system 100 according to aspects of the present invention. For brevity, the embodiment of FIG. 2 depicts a simplified configuration. In particular, although this embodiment of the heat tracing system 100 includes four heater loads, i.e., four control loops, it is understood that other embodiments of the heat tracing system 100 may includes any number of heater loads or control loops.

As shown, the heat tracing system 100 includes a controller 112, a plurality of heating loads 114*a*–N, a plurality of control devices 116*a*–N, and sensors 118, 120. A power bus 122 branches into individual connections 124*a*–N that distribute power to each of the heater loads 114*a*–N. In general, the heater load 114*a*–N may be any device that generates heat, such as a heat strip or cable.

In this embodiment, the controller 112 is connected to sensors 118, 120 by electrical lines 128, 130. The sensors 118, 120 are located on the power bus 122. The controller 112 is also connected to control devices 116*a*–N on each of the power branches 124*a*–N by control lines 126*a*–N. In general, the control devices 116*a*–N may be configured to disconnect the heater loads 4*a*–N from the power bus 122 when actuated by the controller 112. The control devices 116*a*–N may be isolation contactors, on/off boxes, relays and/or other types of switches.

In general, the controller 112 may include any type of hardware and/or software configured to execute instructions and perform the operations described herein. For example, the controller 112 may be implemented by one or more processing devices such as a microprocessor, computer, integrated circuit, or any other component, machine, tool, equipment, or combination thereof capable of executing instructions. The controller 112 also may be implemented utilizing software such as a computer program, application, code, or combination thereof embodied permanently or temporarily in any type of storage medium (e.g., EEPROM, magnetic diskette, or propagated signal), such that if the storage medium is read, the functions described herein are performed.

In one embodiment, the controller 112 is a microprocessor-based device and may include proportional integral derivative (PID) controls, relays, circuit breakers, sensor inputs, and control outputs for supporting the operation of the heat tracing system 110. It is further understood that in some embodiments, the controller 112 may include a number of other sensors and connections not illustrated in FIG. 2. For instance, temperature sensors that monitor the output of the heater loads 114*a*–N may be deployed throughout the heat tracing system and the requisite control circuitry provided in the controller 112.

In one implementation, the controller 112 may enable digital communication for the control loops and provide alarms for high and low current levels, for ground fault leakage, and/or other conditions. In some cases, the controller 112 may provide for centralized set-up of control loop parameters, temperature and current setpoints, and alarm conditions. In addition, it is to be understood that the controller 112 also may provide additional control of the heater loads 114*a*–N and other functions beyond the detection of ground fault leakage or current changes described herein in accordance with aspects of the present invention.

The controller 112 may be configured to monitor the heat tracing system 100, for example, by performing periodic tests on the heat tracing system 100. For instance, if the heat tracing system 100 is in an idle mode where none of the heater loads 114*a*–N are operating, the controller 112 may perform a maintenance time check at periodic intervals by energizing and monitoring each of the heater loads 114*a*–N for a selected period of time. If, on the other hand, the heat tracing system 100 is in a normal operating mode where the heater loads 114*a*–N are turning on and off, the controller 112 may perform an operating time check at periodic intervals (e.g., every ten minutes) lasting for a selected period of time (e.g., fifteen seconds).

As depicted in FIG. 2, the heat tracing system 100 includes a current transformer or current monitor 118 as well as a ground fault detector 120. The current monitor 118 may be structured and arranged to detect changes in the current supplied to all of the heater loads 114*a*–N. The ground fault detector 120 may be structured and arranged to detect current leakage due to a ground fault in any of the heater loads 114*a*–N. In this embodiment, the current monitor 118 and the ground fault detector 120 are located on the power bus 122 before the separation of the power bus 122 into branches 124*a*–N.

In the event that the current to one or more of the heater loads 114*a*–N changes, the current monitor 118 detects this condition and provides signals indicative of a deviation in the power bus 122 to the controller 112 through the control line 128. In the event that one or more of the heater loads 114*a*–N are grounded, the ground fault detector 120 detects this condition and provides a signal indicative of a ground fault condition to the controller 112 through the control line 130. In this way, the controller 112 uses the sensors 118, 120 to monitor the multiple heater loads 114*a*–N, as opposed to monitoring each heater load 114*a*–N individually for a ground fault condition and/or current deviation. If a ground fault and/or current deviation occurs in any one of the heater loads 114*a*–N, the controller 112 overrides the nominal control cycle of the entire system by disconnecting all of the heater loads 114*a*–N. The controller 112 then steps through each control loop one at a time.

As each control loop is individually reconnected, its ground fault condition and/or current level are determined. The heater load 114*a*–N, which initially triggered the ground fault condition, is then isolated from the system and the remaining non-faulted heater loads are returned to normal service. While each control loop is individually connected, the current monitor 118 may monitor the current supplied to each heater load 114*a*–N. For instance, the ampere level of the connected heater load 114*a*–N may be checked against a high and low setpoint to determine if any deviations have occurred in the connected load. The value also may be stored for further reference.

As a particular example, during normal operation with the heater loads 114*a*–N connected, the ground fault detector 120 monitors parameters of the power bus 122. If a ground fault condition occurs in heater load 114*b* on branch 124*b*, for instance, the ground fault detector 120 sends a signal indicative of a ground fault condition to the controller 122 through the control line 130. The controller 112 determines whether the signal for the sensor 120 indicates that a ground fault leakage has occurred in one of the heater loads 114*a*–N. Because it is determined that a ground fault has occurred in one of the heater loads 114*a*–N, the controller 112 returns control signals to actuate all of the control devices 116*a*–N through control lines 126*a*–N and breaks the flow of power to all of the heater loads 114*a*–N.

The controller 112 then initiates a ground fault test cycle. In one implementation of the ground fault test cycle, the controller 112 initially steps to a first control loop and actuates the control device 116*a* to reconnect the heater load 114*a*. The ground fault detector 120 monitors the power bus 122 for a ground fault condition in the connected heater load 114*a*. The controller 112 determines whether the signal for the sensor 120 indicates that a ground fault leakage has occurred in the heater load 114*a*. Concurrently, the current monitor 118 may monitor the current supplied to the connected heater load 114*a*. The controller 112 may check the signal from the current monitor 118 against high and low setpoints or other parameters to determine if any deviations have occurred in the connected heater load 114*a*. The values from the sensors 118, 120 may also be stored for further reference.

In this example, with a ground fault condition not present in the heater load 114*a*, the controller 112 determines that no deviation has occurred in the connected heater load 114*a*. The controller 112 actuates the control device 116*a* to again disconnect the heater load 114*a*. The controller 112 then steps to the second control loop and actuates the control device 116*b* to reconnect the heater load 114*b*. The ground fault detector 120 monitors the power bus 122 for a ground fault condition in the connected heater load 114*b*. The controller 112 determines whether a signal from the sensor 120 indicates that a ground fault leakage has occurred in the heater load 114*b*. Concurrently, the current monitor 118 may monitor the current supplied to the connected heater load 114*b*.

Because a ground fault condition is present in heater load 114*b*, in this example, the controller 112 permanently separates heater load 114*b* from the control system. The controller 112 actuates the control device 116*b* to permanently disconnect the heater load 114*b* and retains an indication that the heater load 114*b* contains a ground fault condition. Alarm signals then may be activated indicating that the heater load 114*b* contains a ground fault condition.

To complete the testing for ground fault conditions, the controller 112 then steps to the remaining control loops to monitor the other heater loads 114*c*–N for a ground fault condition. Because the other heater loads 114*c*–N do not have a ground fault, the control devices 116*c*–N are not given permanent breaks. Once the testing cycle is completed, the controller 112 actuates the control devices 116*a*, 116*c*–N to reconnect the non-faulted heater loads 114*a*, 114*c*–N and returns them to normal service. The heater load 114*b* that initially triggered the ground fault condition is isolated from the system, and the control device 116*b* is not actuated.

Figure 3:
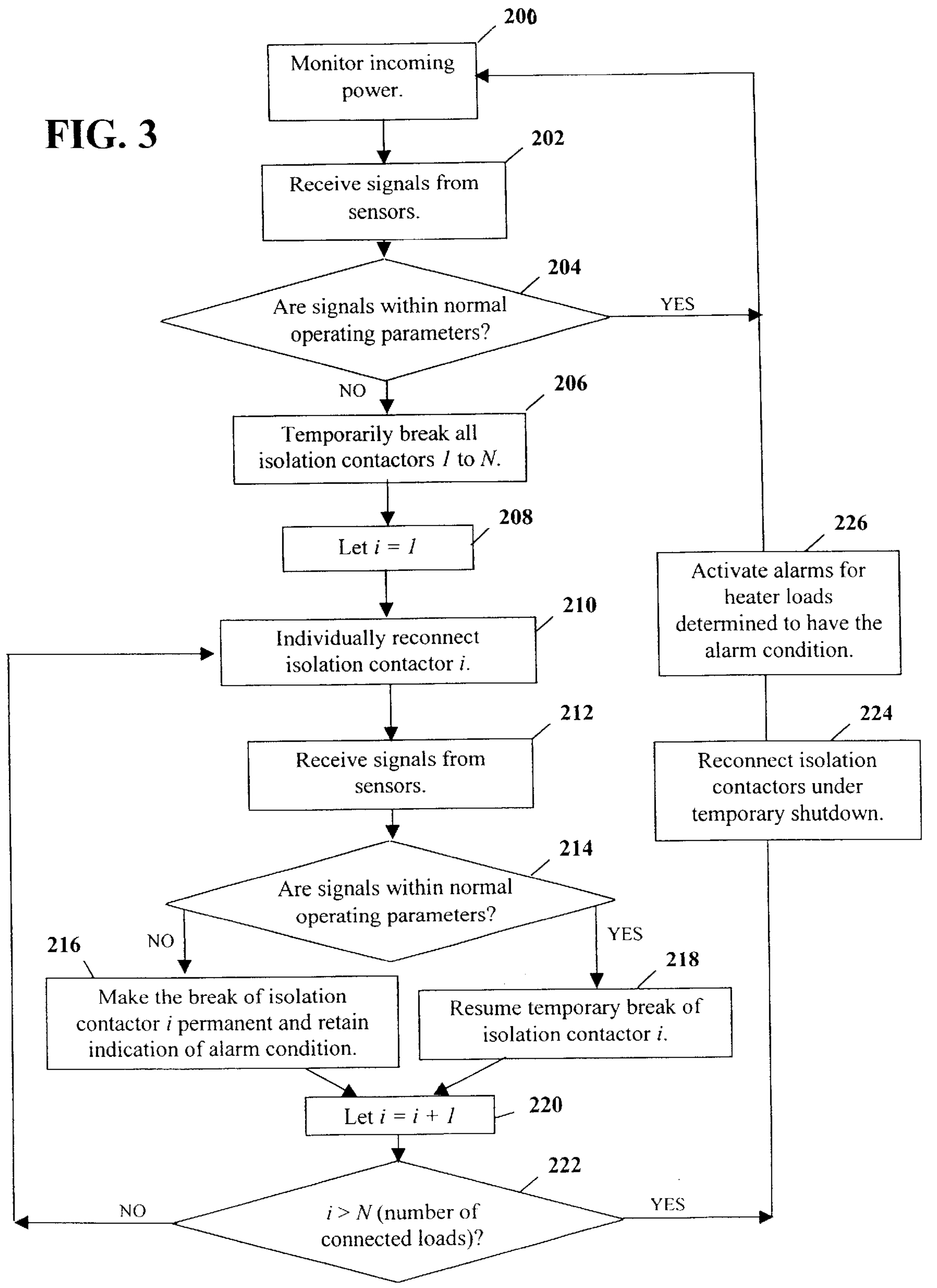
FIG. 3 illustrates a flowchart for monitoring control loops of a heat tracing system according to aspects of the present invention.

FIG. 3 illustrates a flowchart for monitoring control loops of a heat tracing system according to aspects of the present invention. The procedure may be implemented by any suitable type of hardware (e.g., device, computer, computer system, equipment, component); software (e.g., program, application, instructions, code); storage medium (e.g., disk, external memory, internal memory, propagated signal); or combination thereof. In one implementation, the procedure may be implemented by a controller. It is understood, however, that the flowchart does not attempt to identify all of the functions of a controller for use in a heat tracing system. Additionally, the functions illustrated in FIG. 3 may have additional steps that refine specific functions performed by the controller or separate routines dedicated to either of the sensors.

The controller monitors incoming power of a power bus (Block 200). The controller monitors the power bus by receiving signals from a current monitor and/or receiving signals from a ground fault detector (Block 202). The controller determines whether the signals are within normal operating parameters (Block 204). Specifically, the controller may determine whether the signals meet specific criteria of a ground fault condition or other current deviation, or the controller may check whether the current in the power bus lies outside specific setpoints or parameters.

If the signals are determined to be within normal operating parameters, the controller returns to monitoring the incoming power in the power bus (Block 200). If, however, the signals from the sensors indicate a ground fault condition or other current deviation, the controller temporarily breaks all of the isolation contactors 1 to N (Block 206). For example, the control devices may be implemented as isolation contactors, which respond to the controller and actuate to break the flow of power to all the heater loads. Current to the heater loads ceases, and the controller then initiates a testing cycle to determine which of the heater loads has triggered the ground fault condition or current deviation.

The controller begins the testing cycle by letting the number of the control loop for testing to be i=I (Block 208). Although a sequential testing cycle is described herein, it is understood that the testing cycle may use specific criteria to perform the test, such as a user defined sequence or a sequence based on heater load capacities. The controller individually reconnects the isolation contactor i and monitors the incoming power with the current monitor and/or the ground fault detector (Block 210). The controller may produce a defined test current through the power bus. The value of the test current may depend on the size of the existing ground fault leakage and the system voltage, for example. The controller again receives the current monitor signal and/or the ground fault detector signals form the power bus with only the $i^{-th}$ heater load connected (Block 212).

The controller again determines whether the signals lie within the normal operating parameters with only the $i^{-th}$ heater load connected (Block 214). The controller determines whether the signals meet specific criteria of a ground fault condition or current deviation. The values of the signals may be stored for further reference. Using the signals from the sensors, the controller is capable of separating the heater loads into two categories during the test cycle—namely, those with the alarm condition and those without the alarm condition. During the testing cycle, those heater loads found to have the alarm condition are permanently broken from connection to the power bus, and those heater loads found not to have the alarm condition are only temporarily broken from connection to the power bus. Specifically, for those heater loads having the alarm condition, the controller retains an indication of the alarm condition, and the associated isolation contactor is permanently broken from the power bus when the system returns to normal operation.

If the signals from the sensors indicate a ground fault condition or current deviation in the $i^{-th}$ heater load, the controller permanently breaks the isolation contactor i, meaning that the $i^{-th}$ isolation contactor may not be reconnected after testing (Block 216). If the signals from the sensors do not indicate a ground fault condition or current deviation, the controller resumes temporary break of the isolation contactor i, meaning that the $i^{-th}$ isolation contactor may be reconnected after testing (Block 218).

The controller then steps the control loop for testing to be i=i+1 (Block 220). If the next control loop i for testing is greater than the number of connected heater loads in the heat tracing system (Block 222), the controller completes the control cycle by reconnecting only the isolation contactors under temporary break (Block 224). The controller activates alarms for the heater loads determined to have the alarm condition, and the isolation contactors under permanent break are not reconnected. The control cycle is complete, and the controller returns to monitoring the incoming power (Block 200).

If the next control loop i for testing is not greater than the number of connected heater loads in the heat tracing system (Block 222), the controller individually reconnects the new isolation contactor i and repeats the individual testing of the connected heater load N (Block 210). As each control loop is individually reconnected through the routines on Blocks 210–222, the ground fault condition and/or current level for each heater load is determined. The one or more heater loads that initially triggered the alarm condition are then isolated by making the break of their isolation contactors permanent.

Figure 4:
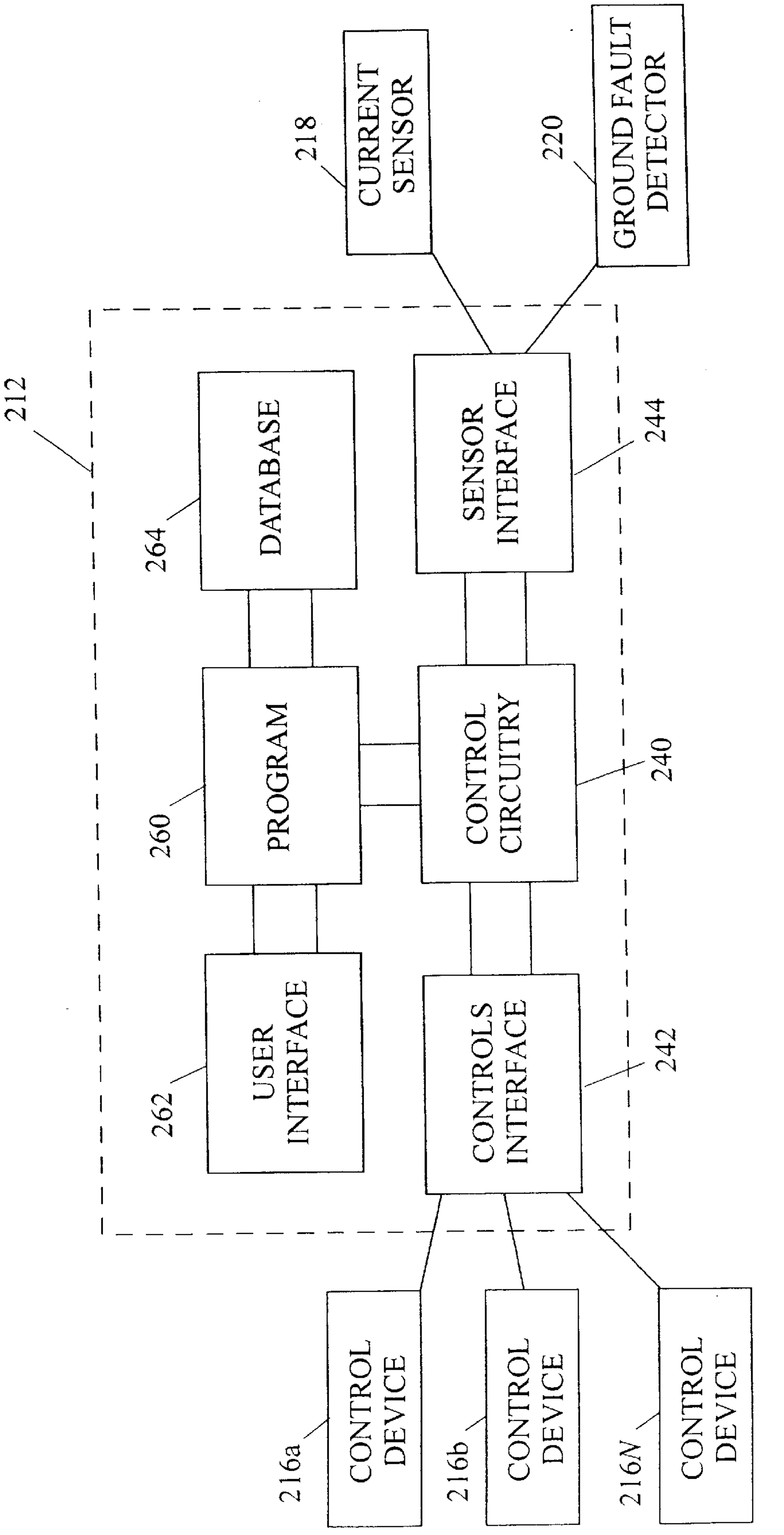
FIG. 4 illustrates one embodiment of a controller according to aspects of the present invention.

FIG. 4 illustrates one embodiment of a controller 212 according to aspects of the present invention. The controller 212 includes control circuitry 240, such as microprocessors, PID controllers and/or relays. The control circuitry 240 constitutes the hardware components of the controller 212 of the heat tracing system. The control circuitry 240 connects to a controls interface 242 that allows the control circuitry 240 to interact with a plurality of control devices 216*a*–N such as relays, circuit breakers and/or isolation contacts. The control devices 216*a*–N execute directives of the controller 212 and implement changes in the heat tracing system, such as turning heater loads on and off according to setpoints, alarms and/or temperature measurements.

As shown, the controller 212 connects to a plurality of sensors, such as current sensor 218 and ground fault detector 220. In general, the sensors 218, 220 measure conditions of the heater loads and send signals to the controller 212. In this implementation, the control circuitry 240 connects to a sensor interface 244 that allows the control circuitry 240 to interact with a plurality of sensors including current sensor 218 and ground fault detector 220, among other sensors. The sensors 218, 220 register changes in the heat tracing system and send signals for processing in the control circuitry 240. In some embodiments, the sensor interface 244 may include communication multiplexers that convert the signals from the sensors 218, 220 from analog to digital code, and the control circuitry 240 may include hardware that can receive the transmitted signals from and to the multiplexers.

The controller 212 includes control software such as a program 260 that provides programmable adaptable parameters, functions, or routines for controlling and monitoring the heat tracing system. In general, the program 260 allows the parameters and functions for the controller 212 to be programmed and changed according to the needs of a particular installation. For example, a user may program the controller 212 through a user interface 262. In one implementation, a user interface 262, as described in the application Ser. No. 10/272,809, entitled "User Interface for Controlling and Monitoring Multiple Control Loops" filed concurrently herewith, commonly owned and incorporated herein by reference in its entirety, may allow a user to program the controller 212. The controller 212 and program 260 are used in conjunction with appropriate mathematical models, e.g., on/off, Proportional-integral-derivative (PDD) control, statistical models or other systems, for monitoring and controlling the heat tracing system.

When the controller 212 receives a signal from one or more of the sensors 218, 220, a routine in the controller 212 determines whether the received signal meets a general alarm condition. The general alarm condition may correspond to a ground fault leakage of the current due to a ground fault and/or a deviation in the ampere level of the power bus. With the general alarm condition being met, the controller 212 actuates the control devices using the controls interface 242.

For example, the controller 212 may actuate the control devices 216$a$–N to disconnect all of the heater loads in the heat tracing system from the power bus. The controller 212 then activates a testing routine that individually reconnects each of the control devices 216$a$N. The controller 212 determines whether signals from the sensors 218, 220 meet a local alarm condition for the individually reconnected heater load.

While the controller monitors each of the heater loads with the sensors 218, 220, a routine of the program 260 may store an indication that the individually reconnected heater load has the local alarm condition in a database 264. Another routine of the program 260 also may store data obtained from the sensors 254, 256 in the database 264. After completing the testing routine of each heater load, a routine in the controller 212 returns the heat tracing system to normal operation. The controller 212 actuates all of the control devices 216$a$–N for the heater loads that do not have the local alarm condition.

While the invention has been described with reference to the embodiments, described above, modifications and alterations are possible by those skilled in the related art. Therefore, it is intended that the invention include all such modifications and alterations to the full extent that they fall within the scope of the following claims or the equivalents thereof.

What is claimed is:

1. A monitoring system comprising:

a sensor for detecting operating conditions concurrently in a plurality of control loops of a heater system and for generating signals corresponding to the detected operating conditions; and a controller for receiving the signals from a first sensor and determining whether the signals indicate the presence of an alarm condition in one or more of the control loops, wherein the controller is configured to temporarily disconnect power to all control loops when it is determined that an alarm condition is present, determine whether the alarm condition is present in an individual connector loop, and reconnect power to only those control loops in which the alarm condition is not present.

2. The monitoring system of claim 1, wherein the alarm condition comprises at least one of a deviation in current level and a ground fault condition.

3. The monitoring system of claim 1, wherein the sensor comprises at least one of a current monitor and a ground fault detector.

4. The monitoring system of claim 3, wherein the sensor comprises a current monitor for detecting an ampere level of power supplied to the plurality of control loops and the controller compares the ampere level against a high setpoint and a low setpoint.

5. The monitoring system of claim 1, wherein the controller further comprises a database for storing data indicating an alarm condition in one or more control loops.

6. The monitoring system of claim 1, further comprising a plurality of control devices, each control device configured to disconnect power to an individual control loop when actuated by the controller.

7. The monitoring system of claim 6, wherein each control device comprises at least one of an isolation contactor, a relay, and a circuit breaker.

8. The monitoring system of claim 1, further comprising a first sensor and a second sensor, the first sensor detecting first operating conditions in the plurality of control loops and the second sensor detecting second operating conditions in the plurality of control loops.

9. The monitoring system of claim 8, wherein the controller receives the signals from the first sensor and the second sensor and temporarily disconnects power to the plurality of control loops when it is determined that at least one of a first alarm condition and a second alarm condition is present in one or more of the control loops.

10. The monitoring system of claim 8, wherein the first sensor comprises a current monitor and the second sensor comprises a ground fault detector.

11. The monitoring system of claim 1, wherein the heater system comprises a power bus connecting the sensor and the plurality of control loops.

12. The monitoring system of claim 11, wherein the power bus comprises a plurality of braches, each branch distributing power to an individual control loop.

13. The monitoring system of claim 12, wherein the sensor is located on the power bus before a separation of the power bus into the plurality of branches.

14. A monitoring method comprising:

determining whether signals received from a sensor indicate the presence of an alarm condition in one or more control loops, the sensor detecting operating conditions concurrently in a plurality of control loops of a heater system and generating signals corresponding to the detected operating conditions;

temporarily disconnecting power to all control loops when it is determined that an alarm condition is present;

determining whether the alarm condition is present in an individual connector loop; and reconnecting power to only those control loops in which the alarm condition is not present.

15. The monitoring method of claim 14, wherein the alarm condition comprises at least one of a deviation in current level and a ground fault condition.

16. The monitoring method of claim 14, wherein determining whether the alarm condition is present in an individual connector loop comprises sending a test signal for detection by the sensor.

17. The monitoring method of claim 14, wherein determining whether the alarm condition is present in an individual connector loop comprises reconnecting an individual control loop to a power bus and monitoring the power bus for the alarm condition.

18. The monitoring method of claim 17, wherein monitoring the power bus for the alarm condition comprises detecting whether the power bus meets a specified parameter.

19. The method of claim 18, wherein detecting whether the power bus meets a specified parameter comprises comparing an ampere level of the power bus against setpoints to determine if deviation has occurred in the individually reconnected control loop.

20. The monitoring method of claim 18, wherein the specified parameter is indicative of current leakage due to a ground fault condition in the individually reconnected control loop.

21. A computer program stored on a computer-readable medium, the computer program comprising:

a first routine for determining whether signals received from a sensor indicate the presence of an alarm condition in one or more control loops, the sensor detecting operating conditions concurrently in a plurality of control loops of a heater system and generating signals corresponding to the detected operating conditions;

a second routine for temporarily disconnecting power to all control loops when it is determined that an alarm condition is present;

a third routine for determining whether the alarm condition is present in an individual connector loop; and a fourth routine for reconnecting power to only those control loops in which the alarm condition is not present.

22. The computer program of claim 21, wherein the computer-readable medium comprises at least one of a device, disk, and propagated signal.

23. The computer program of claim 21, wherein the alarm condition comprises at least one of a deviation in current level and a ground fault condition.

24. The computer program of claim 21, further comprising a routine for isolating one or more control loops having the alarm condition.

25. The computer program of claim 21, further comprising a routine for storing data from the sensor.

* * * * *

UNITED STATES PATENT AND TRADEMARK OFFICE

CERTIFICATE OF CORRECTION

PATENT NO. : 6,735,496 B1

DATED : May 11, 2004

INVENTOR(S) : Alfred R. Roman

It is certified that error appears in the above-identified patent and that said Letters Patent is hereby corrected as shown below:

Title page,
Item [57], ABSTRACT, delete "senor" and substitute therefor -- sensor --.

Column 2,
Line 13, delete "detector" and substitute therefor -- detectors --.
Line 57, delete "senor" and substitute therefor -- sensor --.
Line 57, delete "senor may first" and substitute therefor -- first sensor may --.

Column 3,
Line 29, delete "setpoint" and substitute therefor -- setpoints --.

Column 10,
Line 12, delete "claim 6" and substitute therefor -- claim 1--.

Signed and Sealed this

Ninth Day of November, 2004

JON W. DUDAS
*Director of the United States Patent and Trademark Office*